July 15, 1958 — O. C. NIEDERER ET AL — 2,843,250
EGG HANDLING MECHANISM
Filed Sept. 21, 1953 — 2 Sheets-Sheet 1

INVENTOR.
OTTO C. NIEDERER
OTTO NIEDERER,
BY HERBERT O. NIEDERER
Albert Sperry
ATTORNEY

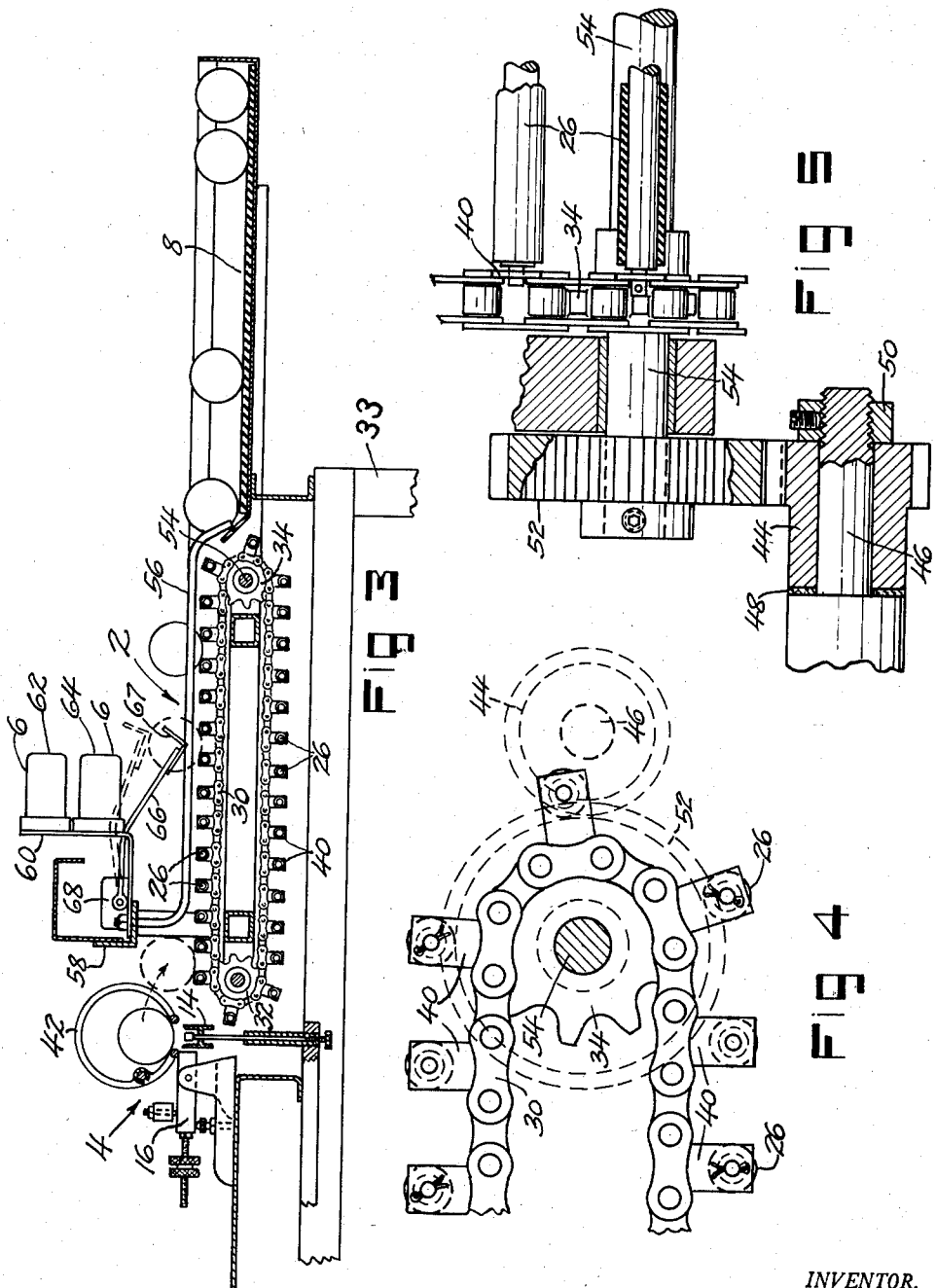

United States Patent Office 2,843,250
Patented July 15, 1958

2,843,250

EGG HANDLING MECHANISM

Otto C. Niederer, Otto Niederer, and Herbert O. Niederer, Titusville, N. J.

Application September 21, 1953, Serial No. 381,274

1 Claim. (Cl. 198—30)

This invention relates to egg handling and conveying means and is directed particularly to constructions for moving eggs in a controlled manner with respect to automatic equipment such as egg graders whereby damage to the eggs is reduced and the number of eggs of each grade sorted may be counted by simple counting mechanism.

One of the greatest problems encountered in the grading and handling of eggs is that of preventing "checking" or the formation of minute or invisible cracks in the shells of the eggs as they roll about and bump against each other in being handled. This problem is most troublesome during the summer months when the thickness and strength of the egg shells is generally reduced and the danger of deterioration or spoilage is greatest.

The bumping together of eggs cannot be entirely avoided even when the eggs are discharged from egg graders and other equipment in a very gentle manner as in the egg graders of our Patents Nos. 2,246,597 and 2,646,168. However, it has been the practice heretofore to provide slanted egg receiving trays wherein the eggs, however discharged, roll away from the equipment by gravity and approach the lower ends of the receiving trays in such a way as to bump against the previously discharged eggs and present the possibility of checking. This has been particularly true in commercial equipment where the egg receiving trays are relatively long and the eggs have an opportunity to gain momentum as they roll down the trays.

It also has been impractical heretofore to provide egg grading equipment with means for counting the number of eggs of each grade handled by the equipment since the load imposed by conventional counters would render the operation of the weighing devices sluggish and inaccurate whereas the irregular and uncertain movement of the eggs as they roll away from a weighing device renders it difficult if not actually impossible to actuate counting mechanism consistently.

In accordance with the present invention these limitations and objections to constructions of the prior art are overcome and means are provided for assisting in the discharge of eggs from automatic equipment such as egg graders and the like, and for moving eggs in a controlled manner which limits or prevents bumping of the eggs and insures positive and controlled movement thereof permitting accurate operation of counting devices and eliminating the necessity of having slanted egg receiving trays. These advantages are preferably attained by providing a novel type of conveying means which may be used in combination with egg graders or other equipment for receiving and moving the eggs in a controlled manner and past any egg counting means employed. The eggs are preferably held in relatively fixed positions on the conveyor during movement thereof so that bumping together of the eggs is prevented, whereas the discharge of the eggs from the conveyor is so smooth and easy that undesired bumping is reduced to a minimum.

The principal object of the present invention is to effect the delivery or movement of eggs in a controlled manner which will reduce or prevent checking of the eggs.

Another object of the invention is to deliver eggs from a grading device in such a way as to permit counting of the eggs of each grade.

A further object of the invention is to provide novel conveying means for use with automatic or power driven equipment to move eggs in a controlled manner with respect to the equipment.

A specific object of the invention is to provide egg grading equipment with means for delivering graded eggs therefrom while holding the eggs against rolling and in position to permit accurate counting thereof.

These and other objects and features of the present invention will appear from the following description thereof in which reference is made to the figures of the accompanying drawings.

In the drawings:

Fig. 3 is a vertical sectional view taken through the assembly of Fig. 2 on line 3—3 thereof;

Fig. 4 is an enlarged view of a detail of the conveying device illustrated; and

Fig. 5 is a view partly in section and partly in elevation illustrating a preferred type of driving connection for the conveyor shown in the drawings.

Figure 1:
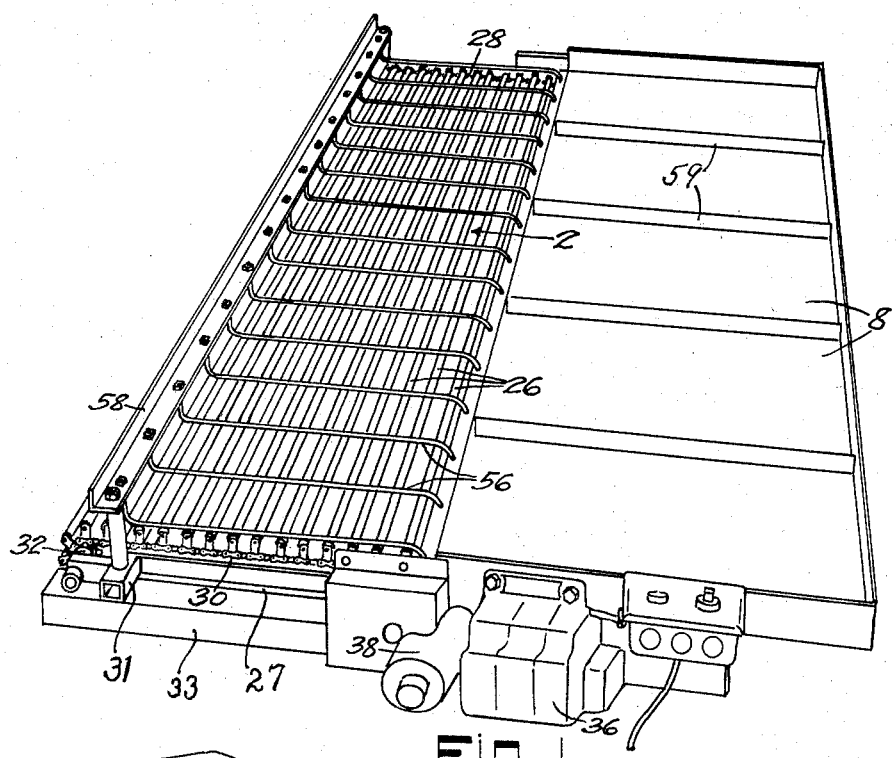
Fig. 1 is a perspective illustrating a typical form of egg conveying mechanism embodying the present invention.

In that form of the invention chosen for purposes of illustration in the drawings the conveying mechanism is illustrated at 2 and is employed for receiving and transferring eggs from the egg grading device 4 so as to move the graded eggs past counter devices 6 and deliver them to the substantially level egg receiving trays 8.

The egg grading device illustrated is of the type shown and described in our issued Patents Nos. 2,246,597 and 2,646,168. Such devices are supplied with eggs which move along the inclined tracks 10 over a light source in the enclosure 12 for candling purposes and into position to be moved by a conveying bar 14 to successive weighing positions where the eggs are deposited on the weighing devices 16, 18, 20, 22 and 24. The weighing devices are adjusted to respond to progressively decreasing weights so that only the heaviest eggs are discharged from the weighing devices 16, whereas eggs of progressively decreasing weight are discharged by the weighing devices 18, 20 and 22 and the smallest eggs are discharged by the final weighing device 24.

Figure 2:
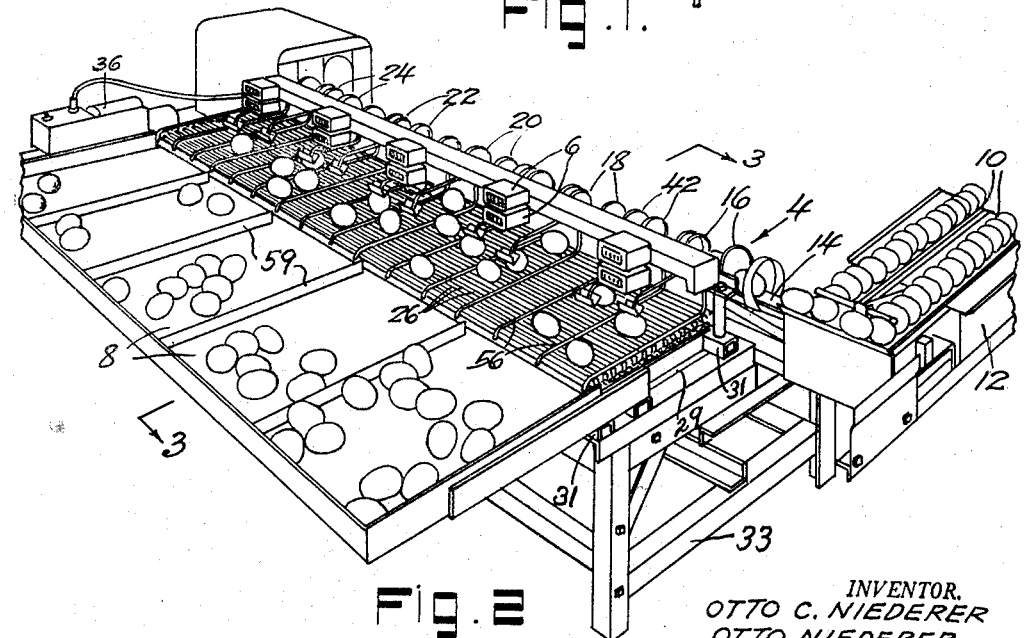
Fig. 2 is a perspective illustrating a typical egg grading and counting mechanism including the conveying mechanism embodied in the construction of Fig. 1.

In the construction illustrated in Fig. 2, the eggs are moved in pairs along the device and a pair of similarly adjusted weighing devices are located at each station so that the capacity of the device is large. However, it will be understood that the egg grading device may handle the eggs singly and the number of grades may be either more or less than five as shown. Moreover, any suitable type of egg grading equipment may be employed and the conveying means of the present invention can be used in combination with egg cleaners, feeders or other handling equipment or wherever it is desired to move eggs in a controlled and orderly manner from one location to another.

In accordance with the present invention the eggs discharged from the weighing devices of the egg grader or other equipment are received and moved by the conveying mechanism 2 which, as shown, preferably embodies a plurality of spaced rods 26 having the opposite ends thereof mounted on and movable by the chains 28 and 30. The chains pass about the rear sprockets 32 and the front sprockets 34 and are advanced by a motor 36 acting through a speed reducer 38 to actuate driving elements such as those shown in Fig. 5. The sprockets and motor are preferably mounted on end frame members 27 and 29 which are held in position by bars or tubular members 31 which pass between the upper and lower runs of the conveyor 2. The end frame members may be mounted on the base frame 33 by which the egg grading mechanism and trays are supported.

The rods 26 of the conveyor 2 constitute egg supporting and positioning means and are preferably formed of rubber covered metal with the ends of the rods reduced and rotatably mounted in the lugs 40 mounted on alternate links of the chains 28 and 30. In practice, the locations of the rod carrying lugs 40 on the chain 28 are slightly in advance of the corresponding lugs on the chain 30 so that the rods 26 are slightly inclined with respect to their direction of movement. In this way, vibration of the egg supporting surface of the conveyor due to simultaneous disengagement of the rod carrying links from the sprockets 32 and 34 is prevented and the conveyor moves smoothly from the discharge side of the egg grader toward the egg receiving trays.

The spacing of the rods 26 is such that the eggs will rest thereon and be held in place to travel with the conveyor without rolling about or being displaced during the travel of the conveyor. However, the spacing of the rods is increased as the chains pass about the sprockets 32 and 34 as indicated most clearly in Figs. 3 and 4 and this spacing of the rods as they move upward adjacent the weighing devices allows sufficient space to permit proper tilting of the weighing devices for accurate weighing of the eggs. On the other hand, the rods move upward toward the eggs as the weighing devices tilt in discharging the eggs so that the eggs are picked up and carried away by the conveyor as rapidly as they are discharged and are not permitted to fall or bounce off the scale pans or egg supports 42 of the weighing devices or against any previously discharged eggs.

In order to avoid any danger of injury to an operator whose fingers might be caught between the rods 26 of the conveyor or between the rods and the edges of the egg receiving trays 8, the rods are preferably somewhat flexible and generally are not supported between their opposite ends. As a further safety measure the drive means for the chains 28 and 30 of the conveyor may include a slip connection as shown in Fig. 5 wherein the pinion 44 on the motor driven shaft 46 is connected to the shaft by a friction washer 48 and a nut 50. The pinion 44 drives the gear 52 on shaft 54 to which the sprocket 34 is connected. If the conveyor and sprocket 34 are forcibly retarded for any reason the pinion 44 will slip with respect ot the motor driven shaft 46 preventing serious injury to the operator or to the conveyor or other elements of the assembly.

Channel forming means such as the separator bars 56 are mounted on a bracket 58 which extends across the device above the conveyor and these bars extend over the conveyor in position to separate the eggs of one grade from those of another. Therefore, even if an egg should be discharged from the weighing device in such a way that it tends to roll sideways along the rods 26, it will be prevented from engaging other eggs of the same or a different grade. The separator bars 56 may, if desired, extend over the trays 2 to hold them separated until removed by an operator. However, as shown the egg receiving tray or trays may be in the form of a single wide tray with upwardly projecting dividers 59 thereon dividing the tray into separate areas and constituting continuations of the channel forming means.

Each egg received by the conveyor is thus held in a substantially fixed position and advanced by the conveyor in a controlled manner although not gripped or restrained in such a way as to be in danger of breaking under any circumstances. They are, instead, allowed to rest freely on the rubber covered bars as the conveyor advances.

When counting devices are used these may conveniently be mounted on the bracket 60 and as shown in Figs. 2 and 3 the counter 62 for one egg directing channel, defined by one pair of separator bars 56, may be positioned above the counter 64 for an adjacent egg directing channel. Each counter preferably is provided with a yieldable actuating arm 66 having a feeler plate 67 on the outer end thereof positioned to be engaged by each egg moving through the egg receiving channel on the conveyor. The feeler plate shown is generally V-shaped in cross section so that an egg being advanced into contact therewith will engage an inclined face of the feeler plate and raise the actuating arm 66. As the egg continues to advance with the conveyor the inclined forwardly extending face of the feeler plate rides gradually downward over the receding surface of the egg and the actuating arm descends slowly without any jolt or bounce which might cause the counting device to be actuated repeatedly or imperfectly as the egg passes.

The actuating arm may conveniently actuate a microswitch 68 or other element of the counting device to cause the number wheels thereof to be properly rotated to count the number of eggs of any grade passing through any channel on the conveyor.

The eggs are discharged from the conveyor onto the egg receiving trays as the rods 26 and chains 28 and 30 move downward adjacent the inner edges of the egg receiving trays 8. The counted eggs are thus set down on the trays in such a way as to avoid dumping or discharge in a manner to cause them to roll vigorously about and bump against previously graded and discharged eggs. Moveover, the egg receiving trays do not have to be slanted in order to prevent accumulation of the eggs about the weighing devices. The trays also can be made smaller than heretofore possible since at least a portion of the graded eggs in any channel are held by the conveyor and only slowly added to those already on the tray. Thus jamming, rolling about and bumping together of the eggs is reduced to a minimum and the operator can transfer the eggs to a crate or other receptacle or equipment without difficulty.

The construction described wherein the counters are used is of particular advantage in large installation such as egg auctions and elsewhere where ungraded eggs are received. The number of each grade of eggs can be determined easily for accounting and payment and the owner can be assured that the number of checked or cracked eggs will be kept at a minimum.

While the construction shown and described embodies a preferred type of egg conveyor including spaced rods, the conveyor surface may be continuous and formed of a fabric or rubber belt with ribbed, checkered or otherwise roughened surface designed to reduce the rolling or movement of the eggs relative thereto. The conveyor also may be used with equipment other than egg grading devices and the use of counting means in combination with the conveyor is not essential.

In view thereof it should be understood that the particular form of the invention shown in the drawing and described above is intended to be illustrative only and is not intended to limit the scope of the invention.

We claim:

Egg conveying mechanism comprising a frame, a conveyor operable transversely of said frame, longitudinally spaced guide rods extending transversely of said frame across said conveyor, and egg receiving trays mounted adjacent the discharge side of said conveyor to receive eggs carried by said conveyor, said conveyor comprising a plurality of endless chains spaced longitudinally of said frame and operable transversely of said frame, egg carrying rods spaced transversely of said frame and extending longitudinally thereof between said endless chains, said rods being mounted on said chains for movement therewith, one end of each of said rods being mounted so as to precede the other end thereof, drive means for said conveyor and a motor for operating said drive means.

References Cited in the file of this patent

UNITED STATES PATENTS

| | | |
|---|---|---|
| 1,464,471 | Getz | Aug. 7, 1923 |
| 1,690,756 | Stebler | Nov. 6, 1928 |
| 1,954,164 | Wyland | Apr. 10, 1934 |
| 1,987,873 | Scheu et al. | Jan. 15, 1935 |
| 2,070,980 | Wyland | Feb. 16, 1937 |
| 2,089,936 | Ahlburg | Aug. 17, 1937 |
| 2,153,296 | Brogden | Apr. 4, 1939 |
| 2,687,802 | Davis | Aug. 31, 1954 |
| 2,697,550 | Sneed et al. | Dec. 21, 1954 |
| 2,717,548 | Blair | Sept. 13, 1955 |
| 2,727,625 | Sneed | Dec. 20, 1955 |
| 2,730,301 | Beamish | Jan. 10, 1956 |

FOREIGN PATENTS

| | | |
|---|---|---|
| 666,944 | Germany | Nov. 1, 1938 |